(12) United States Patent
Ray et al.

(10) Patent No.: US 9,006,933 B2
(45) Date of Patent: Apr. 14, 2015

(54) POWER SYSTEM STABILIZATION

(75) Inventors: Swakshar Ray, Guilderland, NY (US); Amol Rajaram Kolwalkar, Bangalore (IN)

(73) Assignee: General Electric Company, Niskayuna, NY (US)

( * ) Notice: Subject to any disclaimer, the term of this patent is extended or adjusted under 35 U.S.C. 154(b) by 845 days.

(21) Appl. No.: 13/278,824

(22) Filed: Oct. 21, 2011

(65) Prior Publication Data

US 2013/0099582 A1    Apr. 25, 2013

(51) Int. Cl.
| H02J 3/24 | (2006.01) |
| H02J 1/02 | (2006.01) |
| H02M 1/12 | (2006.01) |
| H02M 1/14 | (2006.01) |

(52) U.S. Cl.
CPC ........................................ H02J 3/24 (2013.01)

(58) Field of Classification Search
CPC ....................................................... H02J 3/24
USPC ......... 307/102, 105; 700/297; 363/39, 40, 41, 363/42, 43, 44, 45, 46, 47, 48
See application file for complete search history.

(56) References Cited

U.S. PATENT DOCUMENTS

| 6,476,521 | B1 * | 11/2002 | Lof et al. ....................... 307/105 |
| 6,559,561 | B1 * | 5/2003 | Angquist ....................... 307/105 |
| 7,834,643 | B2 | 11/2010 | Yohanan et al. |
| 8,811,765 | B2 * | 8/2014 | Gohshi ........................... 382/263 |
| 2008/0177425 | A1 * | 7/2008 | Korba et al. .................... 700/297 |
| 2010/0023179 | A1 | 1/2010 | Korba et al. |
| 2011/0126038 | A1 * | 5/2011 | Korba et al. .................... 713/401 |

FOREIGN PATENT DOCUMENTS

WO    2011015247 A1    2/2011

* cited by examiner

*Primary Examiner* — Rexford Barnie
*Assistant Examiner* — Rasem Mourad
(74) *Attorney, Agent, or Firm* — Nitin N. Joshi

(57) ABSTRACT

A method of damping power system oscillations includes obtaining an AC measurement signal from a power system location and determining oscillation frequency values in the AC measurement signal. A plurality of single signal components are extracted from the AC measurement signal by subtracting a plurality of processed measurement signals from the AC measurement signal and a damping signal is generated based on the plurality of single signal components. Each of the plurality of processed measurement signals are generated by time delaying the AC measurement signal with a time delay associated with each of the oscillation frequency values other than the oscillation frequency value of the single signal component to be extracted.

19 Claims, 5 Drawing Sheets

POWER SYSTEM STABILIZATION

BACKGROUND

Embodiments of the present invention relate generally to a power flow in a power system. More specifically, the embodiments relate to damping of power system oscillations.

The power system is a complex network comprising of numerous generators, transmission lines, a variety of loads and transformers. With increasing power demand in the power system, some transmission lines are more stressed than was planned when they were built. Since stressed conditions can lead a system to unstable conditions, power system stability has become an important issue. In simple terms, power system stability is defined as the ability of the power system to return to a normal state after a disturbance. The disturbance may be a fault, a loss of a generator or even a sudden increase in power loading.

Small signal stability is a power system stability issue related to low frequency oscillations between generator rotors. It has been the main reason for many power blackouts across the world including the Western Electricity Co-ordination Council (WECC) blackout of 1996. When the power system is heavily loaded, it often exhibits multi-mode oscillations because machine rotors, behaving as rigid bodies, oscillate with respect to one another using the electrical transmission lines between them to exchange energy. These oscillations generally lie in a frequency range between 0.1-3 Hz. The oscillations in this frequency range are generally analyzed in two main oscillation modes: 1) a local mode in the range of 1 to 3 Hz i.e., a generator or a group of generators in a plant swinging against the rest of the system and 2) an inter area mode in the range of 0.1 to 1 Hz i.e., machines in one group oscillate against machines in another group.

In some embodiments, an automatic voltage regulator (AVR) or flexible alternating current system (FACTS) devices are used to damp out the oscillations and improve the power system stability. To effectively damp out the oscillations it is desirable for controllers such as power system stabilizers (PSS) of AVR and FACTS devices to separate a measurement signal of mixed frequencies such as voltage, current or power into various oscillation modes and frequencies and further identify the phase of each separate signal.

Multiple solutions are available for determining values of different frequencies or modes. However, for separating the exact signals or for identifying the exact phase of the signal, not many solutions are available. One of such solutions is to utilize a Finite Impulse Response (FIR) filter tuned to certain frequencies to extract those frequencies from a mixture of frequencies. However, due to frequency domain approach which is limited by the decimation of unwanted frequencies with a per decade decay, it is almost impossible to extract frequencies which are very close to each other. Frequency domain filters with very high orders may be able to provide some solution, but with the increase in the order of the filter, the delay associated with the filtering increases, which results in longer waiting time before the signals can be separated.

For these and other reasons, there is a need for the present invention.

BRIEF DESCRIPTION

In accordance with an embodiment of the present invention, a method of damping power system oscillations is provided. The method includes obtaining an AC measurement signal from a power system location and determining oscillation frequency values in the AC measurement signal. The method further includes extracting a plurality of single signal components from the AC measurement signal by subtracting a plurality of processed measurement signals from the AC measurement signal. Each of the plurality of processed measurement signals are generated by time delaying the AC measurement signal with a time delay associated with each of the oscillation frequency values other than the oscillation frequency value of the single signal component to be extracted. The method also includes generating a damping signal based on the plurality of single signal components.

In accordance with another embodiment of the present invention, a system for damping power system oscillations is provided. The system includes a damping device to generate a damping signal based on a control signal and a damping device controller to generate the control signal. The damping device controller includes a frequency identification module for determining oscillation frequency values in an AC measurement signal and a signal separation module to extract a plurality of single signal components from the AC measurement signal by subtracting a plurality of processed measurement signals from the AC measurement signal. Each of the plurality of processed measurement signals are generated by time delaying the AC measurement signal with a time delay associated with each of the oscillation frequency values other than the oscillation frequency value of the single signal component to be extracted.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As used herein, the term "module" refers to software, hardware, or firmware, or any combination of these, or any system, process, or functionality that performs or facilitates the processes described herein.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In accordance with an embodiment of the present invention a system and method is proposed which extracts multiple signals of different frequencies from a measurement signal. The extracted multiple signals are used with appropriate gain and phase values by a damping controller to derive a control signal that can cancel each of the oscillating frequency components from the signal and can damp the oscillations.

Figure 1:
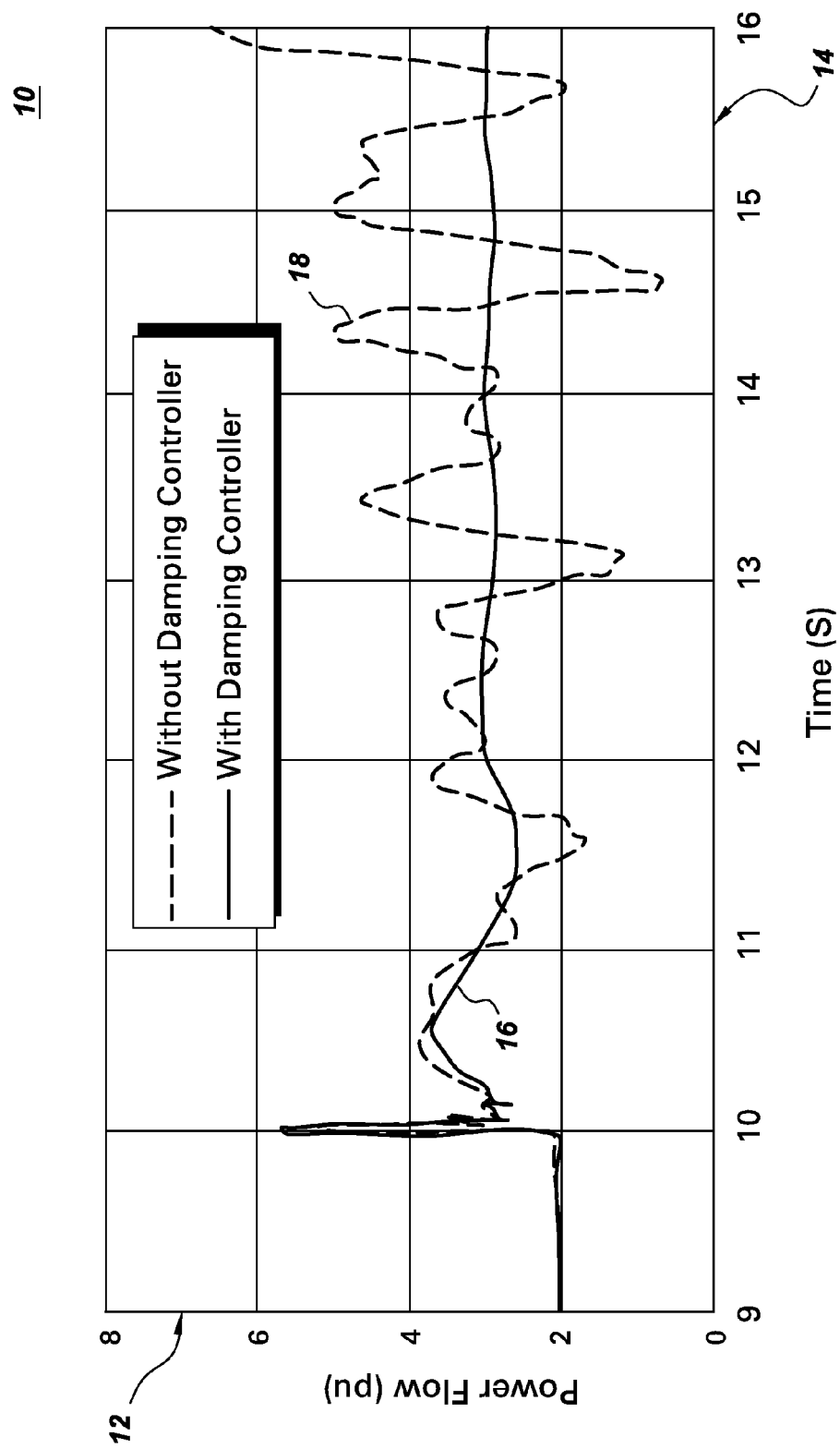
FIG. 1 is a graphical representation of exemplary power oscillations in a power system.

FIG. 1 shows a graphical plot 10 of exemplary power oscillations in a power system. A horizontal axis 14 represents time in seconds whereas a vertical axis 12 represents power flow in a transmission line in per unit (pu). A curve 18 shows power oscillations in the transmission line power flow without a damping controller. Even though only power oscillations are shown here, it should be noted that the oscillations may be present in any other signal such as a voltage or a current or even a generator rotor speed. A power demand on the transmission line gets changed from 2 pu to around 3 pu at 10 seconds. At this transition, power oscillations in curve 18 starts and they increase slowly in amplitude. If these oscillations are not damped, the respective power network may become unstable and may result in a power blackout.

A curve 16 shows power oscillations in the transmission line power flow with a damping device such as an AVR or a FACTS device. As can be seen, when a damping controller is used along with the damping device, the power oscillations attenuate quickly, and the power flow settles down to meet the new demand in around 16 seconds. A spike around 10 seconds is the result of controller parameters and depends on the controller gain value. Also based on Fourier series principles, it can be seen that curve 18 may be split into multiple sinusoidal components of different frequencies. Sinusoidal signals have a property that if two signals 180 degrees out of phase are added, the resultant signal amplitude becomes zero.

Figure 2:
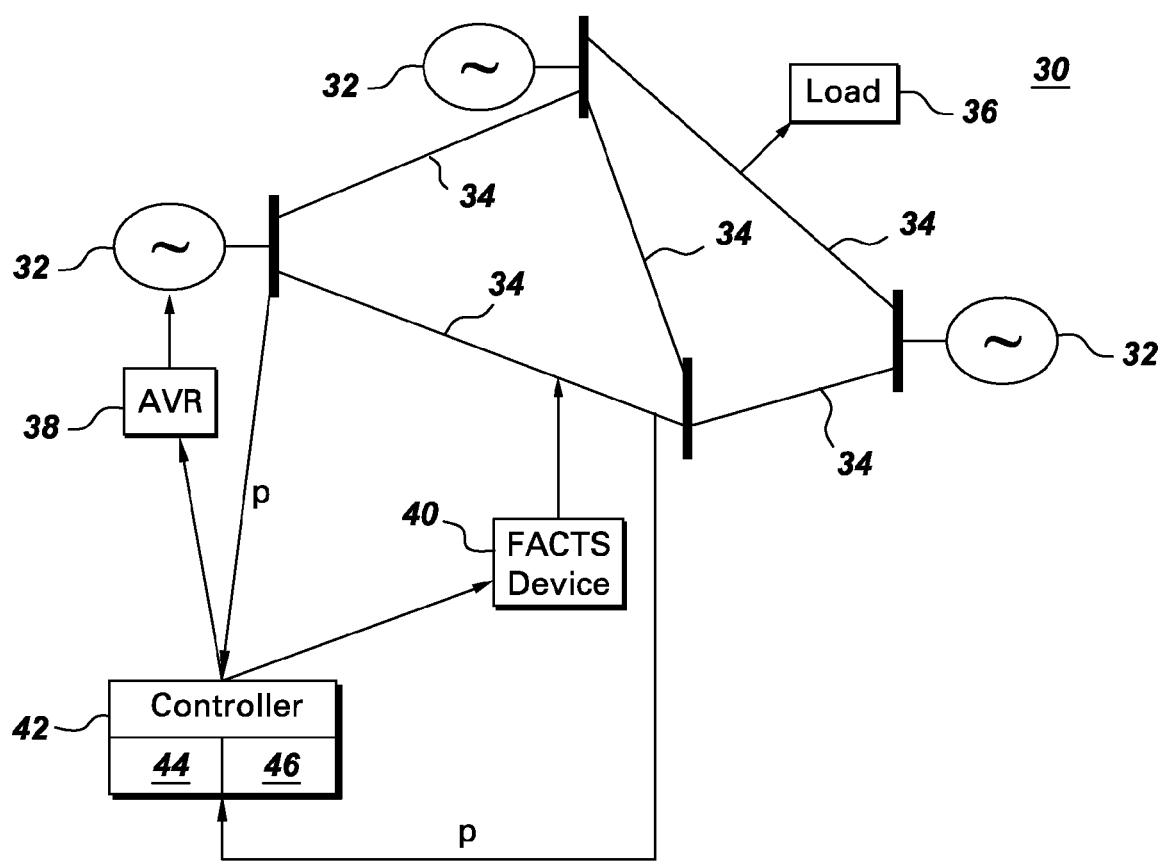
FIG. 2 is a schematic diagram of a power system illustrating a system for damping power system oscillations in accordance with an embodiment of the present invention.

FIG. 2 shows a power system 30 illustrating a system for damping oscillations in accordance with an embodiment of the present invention. Power system 30 includes generators 32, transmission lines 34, and load 36. Power system 30 further includes damping devices such as AVR 38 or FACTS device 40. AVR 38 can damp power system oscillations by controlling the excitation of generator 32 and thus, by controlling power flow from the generator based on an input from controller 42. In other embodiments, each of the generators 32 has an AVR controlled by the controller 42. Similarly, FACTS device 40 can damp power system oscillations by either injecting or absorbing appropriate active and reactive power from the power system 30 based on an input from controller 42. Further, damping devices may be used for other purposes apart from damping the oscillations. For example, the AVR may be used to control a generator output voltage, but when a power system stabilizer (PSS) is used it will also serve the function of the damping device.

Controller 42 receives measurement signals such as voltage or power signals at a point at which generator 32 or FACTS device 40 is connected to transmission line 34. It should be noted that even though controller 42 is shown as a central controller, in other embodiments a separate controller may be used for AVR 38 and FACTS device 40. Controller 42 extracts signal components of different frequencies from the input signal and provides appropriate control signals to AVR 38 and FACTS device 40 to cancel out the extracted frequency components. In one embodiment, FACTS device 40 and AVR 38 may have their individual controllers (not shown) designed for a different purpose such as for reactive power compensation or voltage compensation and output from controller 42 is added to reference signals of the those individual controllers. Thus, the individual controller in addition to its main purpose also acts on command from controller 42 to damp the measurement signal oscillations. It should be noted that there is a difference between signal components of a frequency and a frequency value itself. For example, a frequency value is a constant whereas a signal component is a time varying signal with the associated frequency value.

Controller 42 includes a frequency identification module 44 for analyzing measurement signals and determining the various frequency values. Frequency identification module 44 further determines damping ratios of the signal components in the measurement signal, where the damping ratio is a dimensionless measure describing how oscillations in a system decay after a disturbance. Frequency identification module 44 may utilize model based algorithms i.e., algorithms that depend on approximate data and system modeling or measurement-based algorithms which rely on actual response of a power system to analyze the measurement signals and determine damping ratios. Examples of model based algorithms include algorithms such as a Eigen system realization algorithm and examples of measurement based algorithms include a prony algorithm, a Regularized Robust Recursive Least Square (R3LS) algorithm and a wavelet based algorithm. In one embodiment, frequency identification module 44 does not detect signal components itself. Accordingly, in one embodiment, controller 42 further includes a signal separation module 46 to extract the signal components with associated frequency values and damping information, details of which will be described in following paragraphs. In other embodiments, the functionality of frequency identification module 44 and signal separation module 46 may be combined. In one embodiment, all of the signal components identified are canceled out whereas in another embodiment, only the dominant signal components are canceled. The dominant signal components are the signal components which have higher amplitudes.

Figure 3:
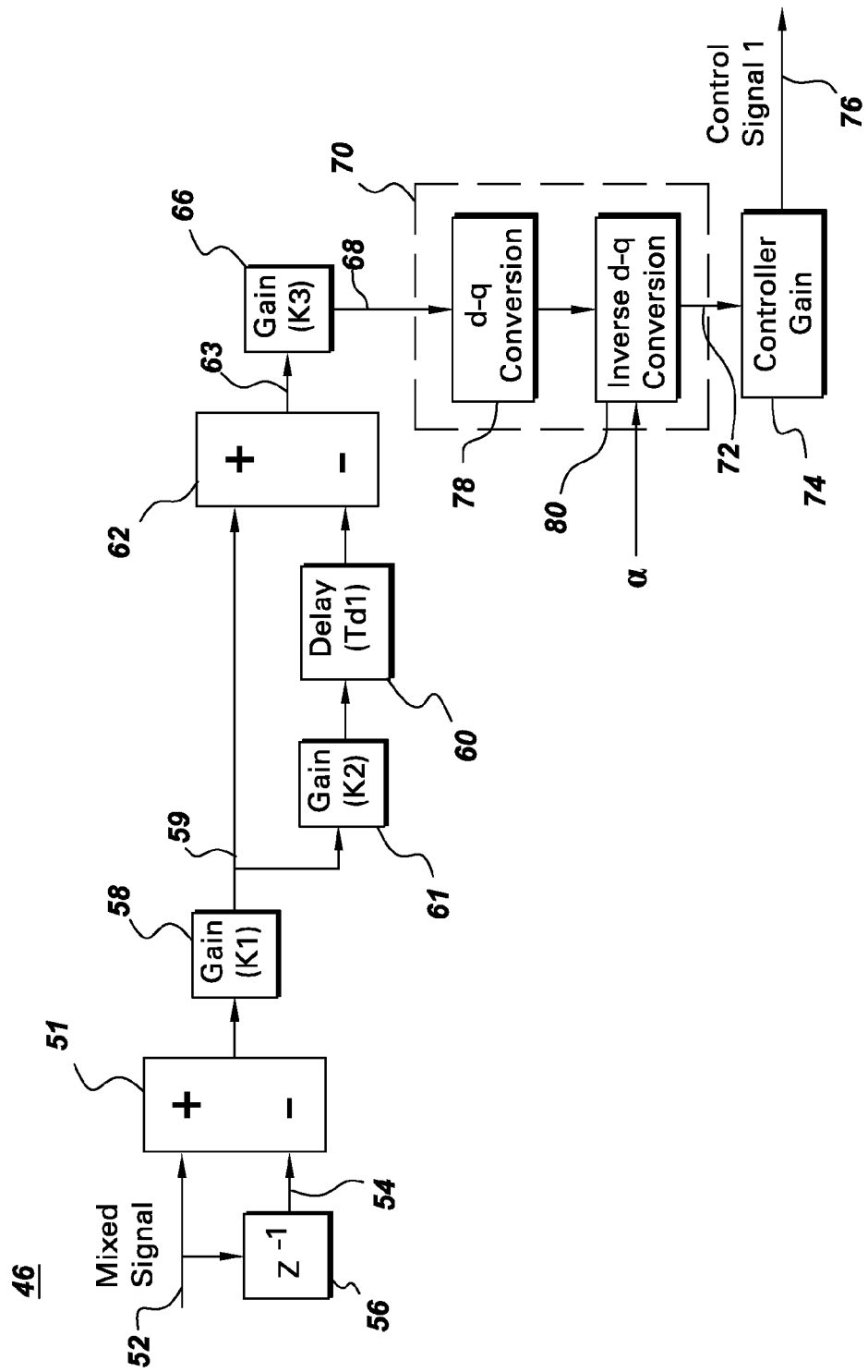
FIG. 3 is a block diagram illustrating details of a signal separation module of FIG. 2 in accordance with an embodiment of the present invention.

FIG. 3 shows a block diagram illustrating details of signal separation module 46 of FIG. 2 in accordance with an embodiment of the present invention. First, it should be noted that the details shown here are for extraction and damping of only a single signal component. For extraction of signal components of other frequencies, the same architecture would be repeated with some modifications based on the number of modes in a measurement signal 52. In one embodiment, the number of repetitions may be obtained by a software module, which after identifying the number of single signal components and related parameters, executes code to perform a desired number of repetitions. For example, if measurement signal 52 includes 4 signal components of 4 different frequencies then the architecture shown in FIG. 3 would be repeated 4 times. In one embodiment, the signal component of a particular frequency may also be obtained by subtracting all other extracted signals from measurement signal 52 i.e., if there are 3 modes, 2 signal components may be obtained by utilizing the illustrated architecture twice and the third signal component may be obtained by subtracting the 2 signal components from measurement signal 52.

Signal separation module 46 utilizes a subtraction block 51 to subtract a delayed measurement signal 54 from measurement signal 52 to remove any DC bias or noise contained in measurement signal 52. Delayed measurement signal 54 may be generated by a delay block 56 with a delay of a sampling period. The output signal from subtraction block 51 is then multiplied by a gain $K_1$ in a gain block 58 to compensate for any change in signal strength or attenuation. The gain $K_1$ is dependent on various factors and in one embodiment, it may be given as:

$$K_1 = \frac{1}{\sqrt{(1 - e^{2\pi f_1 T \delta_1} * \cos(2\pi f_1 T))^2 + (e^{2\pi f_1 T \delta_1} * \sin(2\pi f_1 T))^2}} \quad (1)$$

where $\delta_1$ is a damping ratio and $f_1$ is a frequency of the signal component that needs to be damped. The values $\delta_1$ and $f_1$ may be obtained from frequency identification module 44 (FIG. 2). Further, T is a sampling time.

An output signal 59 of gain block 58 is then further multiplied by a gain $K_2$ in block 61. Output signal 59 may also be referred as alternating current (AC) measurement signal as it is generated by removing DC bias from measurement signal 52. The resultant signal from block 61 is then delayed by a delay block 60 and subtracted from AC measurement signal 59 via a subtraction block 62 to obtain a single signal component 63 which is one among other signal components that needs to be damped. The gain $K_2$ is dependent on damping ratio of the signal component of frequency $f_2$ and may be given as:

$$K_2 = e^{-\pi\delta_2} \tag{2}$$

The single component of the single frequency is obtained by adjusting a delay $T_{d1}$ of delay block 60. Delay $T_{d1}$ is dependent on frequency values of other signal components in measurement signal 52 and when there are only two signal components as in this case, it may be given as:

$$T_{d1} = \frac{0.5}{f_2} \tag{3}$$

where $f_2$ is the frequency value of a second signal component and it is multiplied by 0.5 to obtain 180 degree phase shift to cancel out signal component of frequency $f_2$. Please note that since in this embodiment measurement signal 52 includes only two signal components of two frequencies $f_1$ and $f_2$, only one delayed signal of frequency $f_2$ is subtracted from AC measurement signal 59 to generate single signal component 63 of frequency $f_1$. However, if measurement signal 52 includes 4 signal components of 4 different frequencies then to get a single signal component, 3 delayed signals with 3 different delay times respective to 3 frequencies would be subtracted from AC measurement signal 59. Single signal component 63 is then further multiplied by a gain $K_3$ from gain block 66 to compensate for the change in signal attenuation. In the embodiment shown in FIG. 3, gain $K_3$ is dependent on damping ratios and frequency values of both signal components and may be given as:

$$K_3 = \frac{1}{\sqrt{\left(1 + e^{-\delta_2\pi + \pi\frac{f_1}{f_2}\delta_1} * \cos\left(\pi\frac{f_1}{f_2}\right)\right)^2 + \left(e^{-\delta_2\pi + \pi\frac{f_1}{f_2}\delta_1} * \sin\left(\pi\frac{f_1}{f_2}\right)\right)^2}} \tag{3}$$

An output signal 68 of gain block 66 is then fed to a domain transformation module 70 for generating a phase shifted signal 72. Domain transformation module 70 includes a d-q conversion module 78 and an inverse d-q conversion module 80 which also receives a phase shifting angle $\alpha$ as one input. Details of domain transformation module 70 are given below. Phase shifted signal 72 is used to phase lock the single frequency component with measurement signal 52 (FIG. 3). Phase shifted signal 72 is further multiplied by a controller gain 74 to obtain a control signal 76 which can then be generated by AVR 38 or FACTS device 40 (FIG. 2) to damp the power oscillations related to frequency $f_1$ among other signal components. In one embodiment, all control signals for each of the signal components that need to be damped are added together and provided to AVR 38 or FACTS device. In another embodiment, if there are separate damping devices for each of the signal components then separate control signals are provided to those damping devices.

Figure 4:
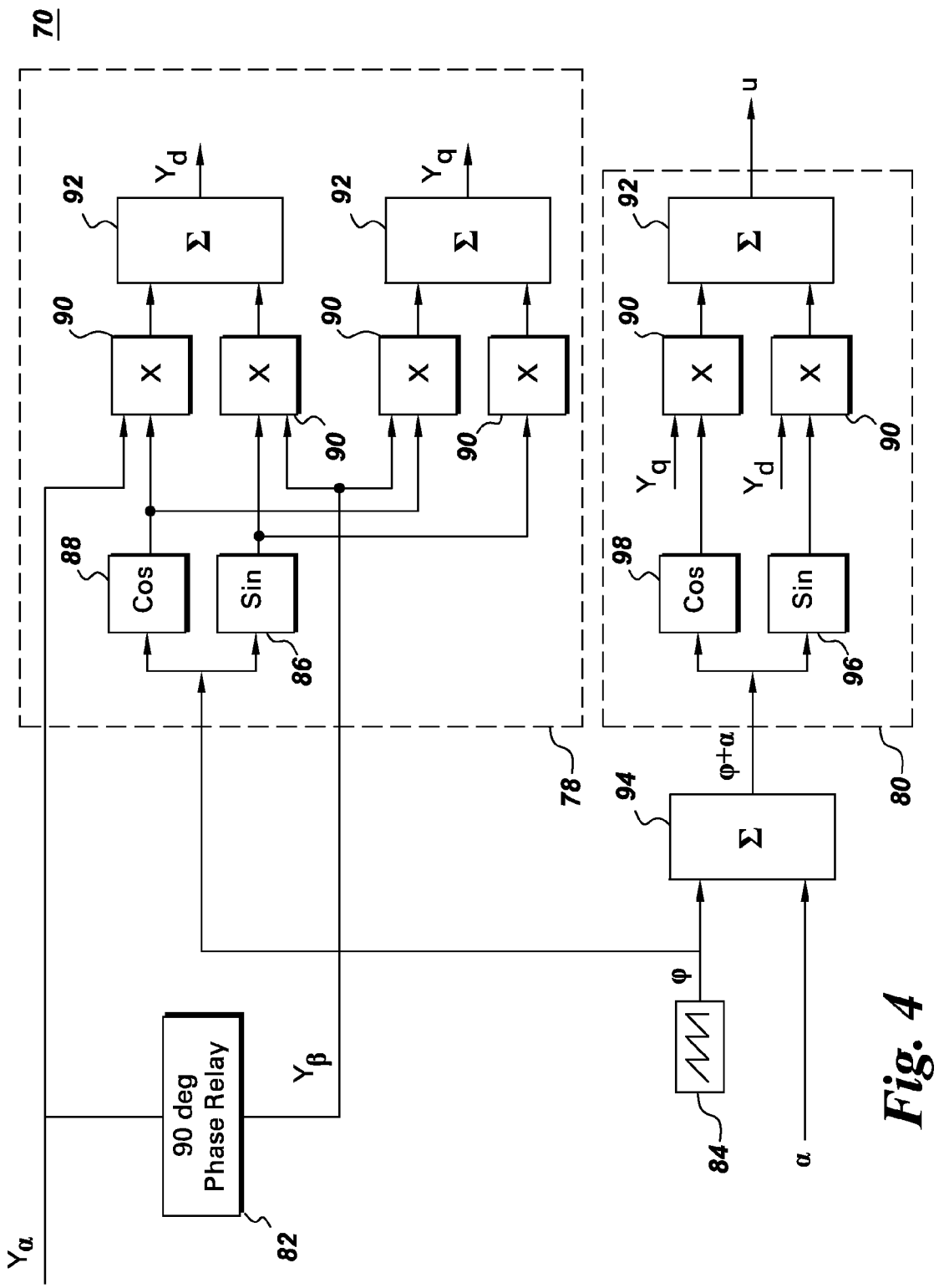
FIG. 4 is a block diagram illustrating details of a domain transformation module of FIG. 3 in accordance with an embodiment of the present invention.

FIG. 4 shows a block diagram illustrating details of domain transformation module 70 of FIG. 3 in accordance with an embodiment of the present invention. Domain transformation module 70 includes a delay module 82, a saw tooth wave generator 84, a d-q transformation module 78 and an inverse d-q transformation module 80.

d-q transformation module 78 converts input signal $Y_\alpha$ and a delayed input signal $Y_\beta$ into d-q domain signals $Y_d$ and $Y_q$. The delayed input signal $Y_\beta$ is generated by delay module 82. In one embodiment, delay module 82 delays the input signal $Y_\alpha$ by a delay angle equal to a ¼$^{th}$ or 90 degrees of the frequency value i.e., 0.00666 seconds for a frequency of 600 Hz. d-q transformation module 78 utilizes a saw tooth wave signal representing a phase angle $\phi$ of the signal to be damped to generate d-q domain signals $Y_d$ and $Y_q$. In the present embodiment, the frequency of the saw tooth wave signal may be $f_1$. In another embodiment, phase angle $\phi$ may also be generated by integrating signal 68 or 63 (FIG. 3).

In one embodiment, d-q transformation module 78 may be represented by a matrix equation:

$$\begin{bmatrix} Y_d \\ Y_q \end{bmatrix} = \begin{bmatrix} \cos\phi & \sin\phi \\ \sin\phi & -\cos\phi \end{bmatrix} \cdot \begin{bmatrix} Y_\alpha \\ Y_\beta \end{bmatrix} \tag{4}$$

In FIG. 4, implementation of above equation is shown. For example, phase angle $\phi$ is provided as input to sine and cosine modules 86, 88 to generate $\sin\phi$ and $\cos\phi$ respectively. Further, multiplication blocks 90 and algebraic blocks 92 are arranged to obtain signals Yd and Yq.

Inverse d-q transformation module 80 generates a phase shifted signal U from d-q domain signals Yd and Yq. A phase shift angle $\alpha$ is added to phase angle $\phi$ by a summation block 94 and the resultant summation ($\phi+\alpha$) is utilized by inverse d-q transformation module 80 to generate phase shifted signal U. Phase shift angle is dependent on frequency values and damping ratios of all signal components in measurement signal. In one embodiment, d-q transformation module 78 may be represented by an equation:

$$U = Yd*\sin(\phi+\alpha) + Yq*\cos(\phi+\alpha) \tag{5}$$

To generate $\sin(\phi+\alpha)$ and $\cos(\phi+\alpha)$, the signal ($\phi+\alpha$) is provided to sine and cosine modules 96 and 98 respectively. Multiplication blocks 90 and algebraic block 92 are then arranged to obtain phase shifted signal U. Phase shifted signal U may then be utilized to generate a control signal to damp the measurement signal oscillations related to frequency $f_1$. In a similar manner, power oscillations related to other frequencies may be damped.

Figure 5:
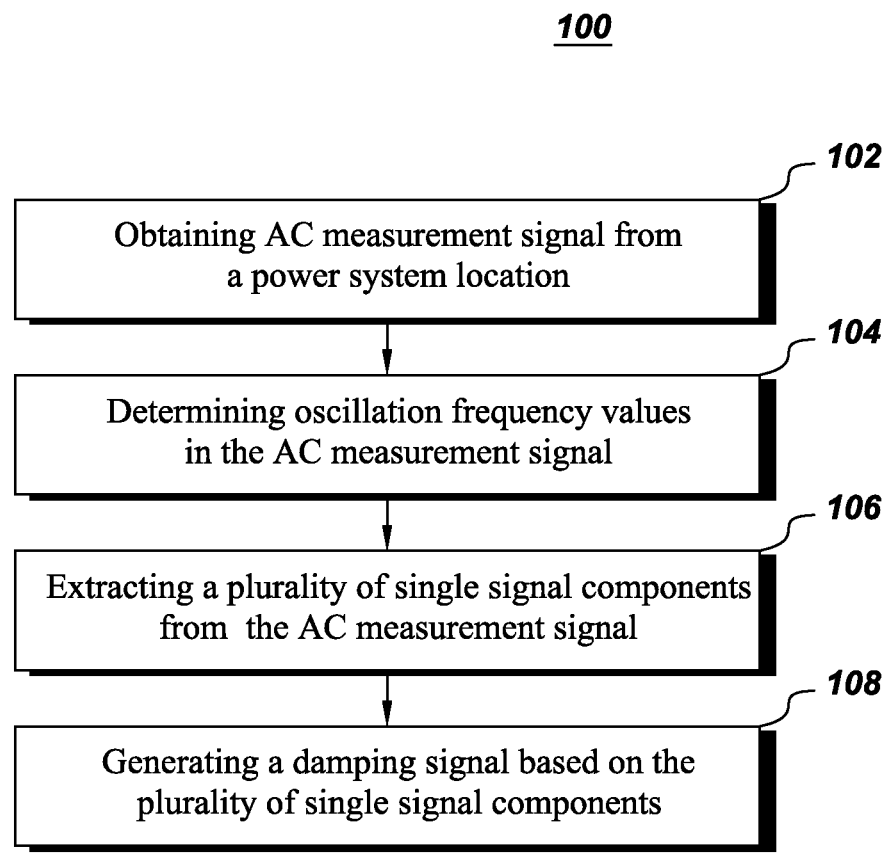
FIG. 5 is a flow chart illustrating a method of damping power system oscillations in accordance with an embodiment of the present invention.

FIG. 5 shows a flow chart 100 illustrating a method of damping power system oscillations in accordance with an embodiment of the present invention. The method includes obtaining an AC measurement signal from a power system location at step 102. In one embodiment, the AC measurement signal is obtained by removing a DC bias from a measurement signal. At step 104, oscillation frequency values in the AC measurement signal are determined and a plurality of single signal components from the AC measurement signal are extracted at step 106. The oscillation frequency values may be identified at step 104 by utilizing model based algorithms or measurement-based algorithms. To extract the plurality of single signal components a plurality of processed measurement signals from the AC measurement signal are subtracted wherein each of the plurality of processed measurement signals are generated by time delaying the AC measurement signal with a time delay associated with each of the oscillation frequency values other than the oscillation frequency value of the single signal component to be extracted. Finally the method includes generating a damping signal based on the plurality of single signal components at step 108.

One of the advantages of the present invention is that it damps frequencies of small signal oscillation without affecting any other frequency. It also increases accuracy of extraction of individual components from a measurement signal. Further, it is computationally fast as compared to filter based extraction methods.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of damping power system oscillations comprising:
    obtaining an AC measurement signal from a power system location;
    determining oscillation frequency values in the AC measurement signal;
    extracting a plurality of single signal components from the AC measurement signal by subtracting a plurality of processed measurement signals from the AC measurement signal,
    wherein each of the plurality of processed measurement signals are generated by time delaying the AC measurement signal with a time delay associated with each of the oscillation frequency values other than the oscillation frequency value of the single signal component to be extracted; and
    generating a damping signal based on the plurality of single signal components.

2. The method of claim 1, wherein obtaining the AC measurement signal comprises removing a DC bias from a measurement signal.

3. The method of claim 2, wherein removing the DC bias from the measurement signal comprises subtracting a time delayed measurement signal with a time delay of one sampling period from the measurement signal and multiplying a resultant difference with a first gain value.

4. The method of claim 3, wherein the first gain value is dependent on a damping ratio and the oscillation frequency value of the respective single signal component that is being extracted.

5. The method of claim 1, wherein generating the damping signal comprises phase shifting the plurality of single signal components to phase lock them with the AC measurement signal.

6. The method of claim 5, wherein phase shifting the plurality of single signal components comprises transforming the plurality of single signal components into a plurality of d-q domain quantities with a phase angle associated with the oscillation frequency value of the respective single signal component.

7. The method of claim 6, wherein phase shifting the plurality of single signal components further comprises inverse transforming the plurality of d-q domain quantities into a phase shifted signal with an angle dependent on the phase angle and a phase shift angle.

8. The method of claim 7, wherein the phase shift angle is dependent on the oscillation frequency value and damping ratio of the respective single signal component.

9. The method of claim 5, wherein the plurality of single signal components are multiplied by a third gain value before phase shifting.

10. The method of claim 9, wherein the third gain value is dependent on damping ratios and oscillation frequency values of the plurality of single signal components.

11. The method of claim 1, wherein generating the damping signal comprises summing the plurality of single signal components.

12. A system for damping power system oscillations comprising:
    a damping device to generate a damping signal based on a control signal; and
    a damping device controller to generate the control signal, the damping device controller including:
        a frequency identification module for determining oscillation frequency values in an AC measurement signal;
        a signal separation module to extract a plurality of single signal components from the AC measurement signal by subtracting a plurality of processed measurement signals from the AC measurement signal;
        wherein each of the plurality of processed measurement signals are generated by time delaying the AC measurement signal with a time delay associated with each of the oscillation frequency values other than the oscillation frequency value of the single signal component to be extracted.

13. The system of claim 12, wherein the damping device comprises an automatic voltage regulator or a flexible alternating current transmission device.

14. The system of claim 12, wherein the damping device controller comprises a subtraction module to generate the AC measurement signal by subtracting a time delayed measurement signal with a time delay of one sampling period from a measurement signal to remove a DC bias from the measurement signal.

15. The system of claim 12, wherein damping device controller further comprises a d-q transformation module to phase shift the plurality of single signal components to phase lock them with the AC measurement signal.

16. The system of claim 15, wherein the d-q transformation module comprises a d-q conversion module for transforming the plurality of single signal components into a plurality of d-q domain quantities with a phase angle associated with the respective oscillation frequency.

17. The system of claim 15, wherein the d-q transformation module comprises an inverse d-q conversion module for inverse transforming the plurality of d-q domain quantities into a phase shifted signal based on the phase angle and a phase shift angle.

18. The system of claim 17, wherein the phase shift angle is dependent on the oscillation frequency value and a damping ratio of the respective single signal component.

19. The system of claim 12, wherein the damping device controller generates the control signal by summing the plurality of single signal components.

* * * * *